US007936437B2

(12) United States Patent
Hong et al.

(10) Patent No.: US 7,936,437 B2
(45) Date of Patent: May 3, 2011

(54) DISPLAY DEVICE AND MANUFACTURING METHOD THEREOF

(75) Inventors: Wang-Su Hong, Suwon-si (KR); Jeong-Ye Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 280 days.

(21) Appl. No.: 11/930,254

(22) Filed: Oct. 31, 2007

(65) Prior Publication Data

US 2008/0218679 A1 Sep. 11, 2008

(30) Foreign Application Priority Data

Mar. 5, 2007 (KR) .................. 10-2007-0021368

(51) Int. Cl.
*G02F 1/1339* (2006.01)
(52) U.S. Cl. .................. 349/157; 349/155; 349/156
(58) Field of Classification Search ........... 349/155–157
See application file for complete search history.

(56) References Cited

U.S. PATENT DOCUMENTS

| | | | | |
|---|---|---|---|---|
| 5,556,670 A | * | 9/1996 | Mihara et al. ................. 428/1.5 |
| 6,226,067 B1 | * | 5/2001 | Nishiguchi et al. .......... 349/155 |
| 6,411,360 B1 | * | 6/2002 | Matsuyama et al. ......... 349/156 |
| 6,493,057 B1 | * | 12/2002 | Sato et al. .................... 349/153 |
| 7,576,827 B2 | * | 8/2009 | Lee et al. ..................... 349/155 |
| 2003/0218712 A1 | | 11/2003 | Kumar et al. |
| 2004/0141142 A1 | * | 7/2004 | Choi et al. ................... 349/155 |
| 2007/0002237 A1 | * | 1/2007 | Yoon ............................ 349/129 |

FOREIGN PATENT DOCUMENTS

| | | |
|---|---|---|
| JP | 2001-166314 | 6/2001 |
| JP | 2001-311952 | 11/2001 |
| JP | 2003-066467 | 3/2003 |
| JP | 2004-029487 | 1/2004 |
| JP | 2004-077861 | 3/2004 |
| KR | 1020000071477 A | 11/2000 |
| KR | 1020010077357 A | 8/2001 |
| KR | 1020050045034 A | 5/2005 |
| KR | 1020050068230 A | 7/2005 |
| KR | 1020050087460 A | 8/2005 |
| KR | 1020060070873 A | 6/2006 |

* cited by examiner

*Primary Examiner* — Wen-Ying P Chen
(74) *Attorney, Agent, or Firm* — Cantor Colburn LLP (57) ABSTRACT

A display device includes a first display panel, a second display panel facing the first display panel, and a plurality of spacers maintaining a distance between the first display panel and the second display panel. Each of the spacers includes column spacers, ball spacers, and an adhesive.

20 Claims, 9 Drawing Sheets

DISPLAY DEVICE AND MANUFACTURING METHOD THEREOF

This application claims priority to Korean Patent Application No. 10-2007-0021368, filed on Mar. 5, 2007, and all the benefits accruing therefrom under 35 U.S.C. §119, and the contents of which in its entirety are herein incorporated by reference.

BACKGROUND OF THE INVENTION (a) Field of the Invention

The present invention relates to a display device and a manufacturing method thereof. More particularly, the present invention relates to a display device preventing a cell gap variation and a method of manufacturing the display device.

(b) Description of the Related Art

Liquid crystal displays ("LCDs") are representative of flat panel displays that are used widely at present. The LCD includes two display panels each on which an electrode is formed, spacers with a distance therebetween, a cell gap between two display panels, a liquid crystal ("LC") layer interposed within the cell gap, and a sealant sealing the panels and enclosing the LC layer therebetween. In the LCD, voltages are applied to the electrodes on the two panels to generate an electric field at the liquid crystal layer, and the strength of the electric field is controlled to control transmittance of light that passes through the liquid crystal layer, thus obtaining desired images.

However, since the LCD generally uses a glass substrate that is heavy and has a high risk of breakage, it is difficult to manufacture a large screen and to improve portability thereof.

Recently, flexible LCDs using a plastic substrate having a light weight, resistance to impact, and flexibility have been developed. Thus, when the plastic substrate instead of the glass substrate is used, portability, safety, weight decrease, etc., of the LCD are highly improved. However, the plastic substrate is bent or contracted by heat in manufacturing. By such characteristics of the plastic substrate, the cell gap is varied. With such variation of the cell gap, ball spacers between the panels freely move, and thereby alignment layers formed on the two panels are damaged such that image quality of the LCD decreases. In addition, column spacers are separated from the display panels.

When a physical pressure is applied to the flexible LCD, since the column spacers are flexible, a height difference between the column spacers occurs. Thereby, the cell gap varies over the LCD, and a luminance difference occurs at areas due to the cell gap variation such that image quality of the LCD decreases.

BRIEF SUMMARY OF THE INVENTION

According to exemplary embodiments of the present invention, a display device includes a first display panel, a second display panel facing the first display panel, and a plurality of cell gap spacers maintaining a distance between the first display panel and the second display panel, wherein the cell gap spacers include column spacers, ball spacers, and an adhesive.

The second display panel may include a flexible substrate, a light blocking member formed on the flexible substrate, a color filter formed on the flexible substrate and the light blocking member, and a common electrode formed on the color filter. The cell gap spacers may be formed at portions of the second display panel so as to overlap the light blocking member, and the flexible substrate may include plastic. The second display panel may further include an alignment layer formed on the common electrode, the cell gap spacers formed on the alignment layer.

The display device may further include a liquid crystal layer interposed between the first display panel and the second display panel, and a sealant formed between the first display panel and the second display panel and sealing the liquid crystal layer. The sealant may include column spacers, ball spacers, and an adhesive.

The column spacers of at least one cell gap spacer may be formed on apexes and a center portion of a corresponding portion of a light blocking member of the second display panel, or on apexes of the corresponding portion, or in a triangular shape within the corresponding portion, or may be formed in a 3×2 matrix or a combined shape of a Y-shaped character and a reversed Y-shaped character in a corresponding portion of a light blocking member of the second display panel.

The column spacers of at least one cell gap spacer may have a longitudinal shape, and may be disposed in a line.

The ball spacers and the adhesive may be filled within spaces between the column spacers and may enclose external walls of the column spacers.

Each cell gap spacer may be formed on the second display panel to correspond to an area of the first display panel that does not transmit light, the area including at least one of a thin film transistor ("TFT"), a gate line, and a data line.

At least one of the cell gap spacers may be formed within a quadrangle size of about 40 μm by about 40 μm, and at least one of the first display panel and the second display panel may include a flexible substrate.

According to other exemplary embodiments of the present invention, a manufacturing method of a display device includes forming a first display panel, forming a second display panel that faces the first display panel, forming a plurality of column spacers on the second display panel, filling ball spacers and an adhesive within spaces between adjacent column spacers, and assembling the first display panel and the second display panel.

Filling the ball spacers and the adhesive may include applying a mixture of the ball spacers and the adhesive on a substrate opposing the second display panel, and moving at least one of the substrate and the second display panel to contact the mixture to the column spacers of the second display panel.

Moving at least one of the substrate and the second display panel may include dipping about 30% to about 70% of a height of each column spacer into the mixture.

The manufacturing method may further include forming a sealant on the first display panel or the second display panel between filling the ball spacers and the adhesive and assembling the first display panel and the second display panel.

Forming the column spacers may include using photolithography.

The manufacturing method may further include forming a sealant surrounding a display area of the first and second display panels simultaneously with forming the column spacers and filling ball spacers and an adhesive within spaces between adjacent column spacers, wherein the sealant may include column spacers, ball spacers, and adhesive.

The column spacers, ball spacers, and adhesive may form cell gap spacers, and the method may further include disposing the cell gap spacers in non-transmissive areas of the first and second display panels.

Forming a second display panel may include forming a common electrode panel using a flexible insulating substrate.

BRIEF DESCRIPTION OF THE DRAWINGS

Additional aspects, features, and advantages of the present invention will become more apparent by describing exemplary embodiments thereof in detail with reference to the accompanying drawings, in which.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

A liquid crystal display ("LCD") according to an exemplary embodiment will be described in detail with reference to FIGS. 1 to 3.

Figure 1:
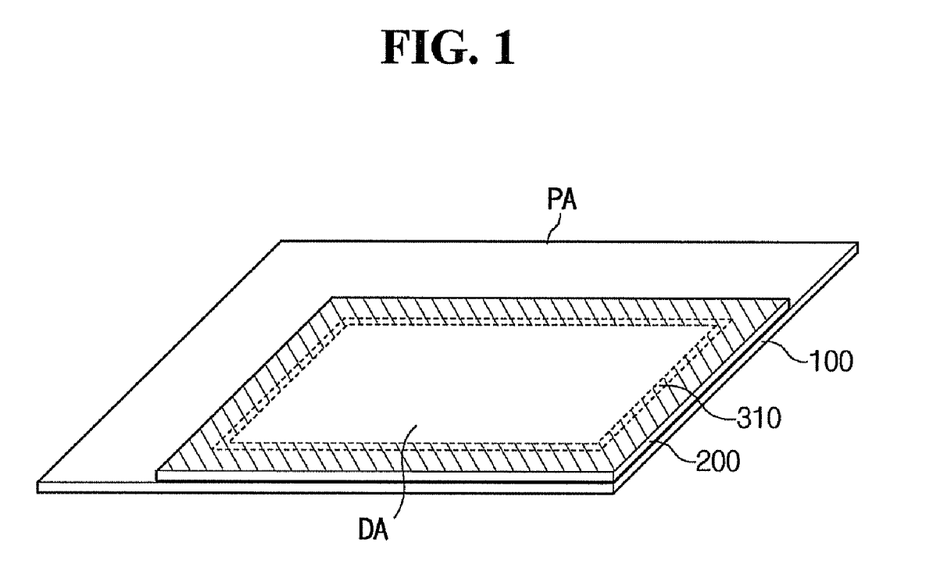
FIG. 1 is a perspective view of an exemplary liquid crystal display ("LCD") according to an exemplary embodiment of the present invention.
Figure 2:
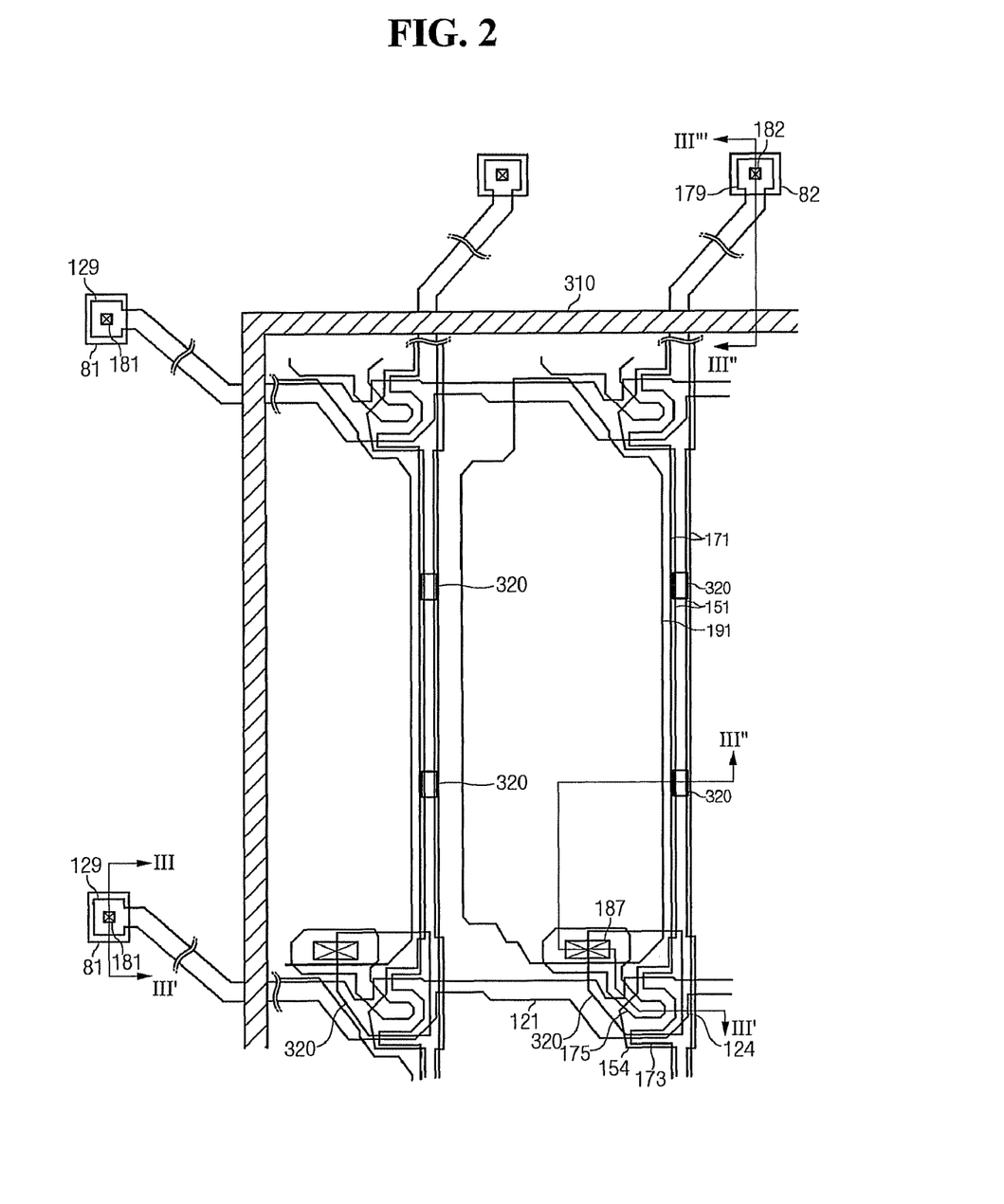
FIG. 2 is a layout view of an exemplary LCD including an exemplary thin film transistor ("TFT") array panel and an exemplary common electrode panel according to an exemplary embodiment of the present invention.
Figure 3:
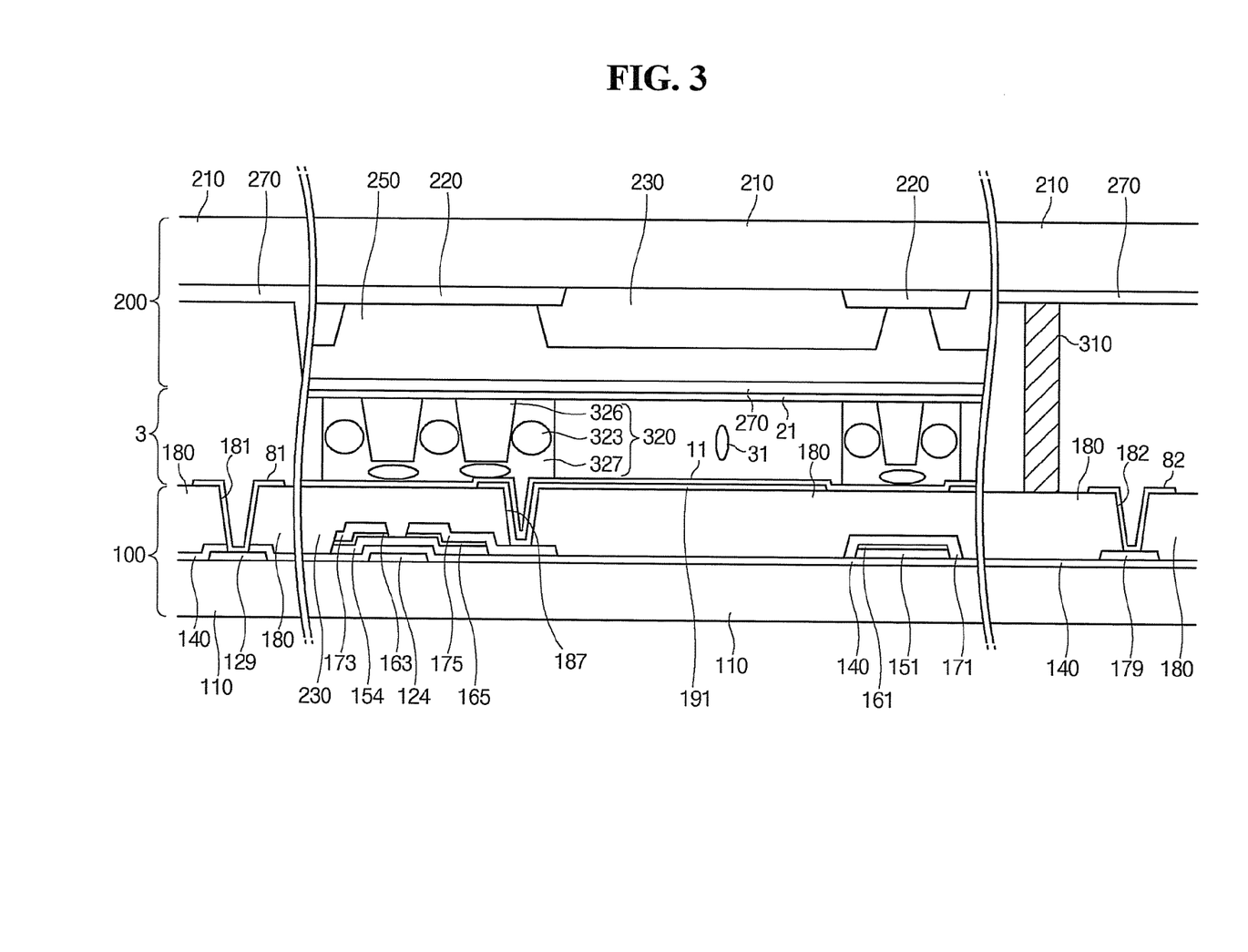
FIG. 3 is a sectional view of the exemplary LCD shown in FIG. 2 taken along lines III-III', III'-III", and III"-III'"

FIG. 1 is a perspective view of an exemplary LCD according to an exemplary embodiment of the present invention, FIG. 2 is a layout view of an exemplary LCD including an exemplary thin film transistor ("TFT") array panel and an exemplary common electrode panel according to an exemplary embodiment of the present invention, and FIG. 3 is a sectional view of the exemplary LCD shown in FIG. 2 taken along lines III-III', III'-III", and III"-III'".

Referring to FIGS. 1 to 3, an LCD according to an exemplary embodiment of the present invention includes a TFT array panel 100, a common electrode panel 200, and spacers 320 that maintain a distance between the two panels 100 and 200, that is, a cell gap. The LCD further includes a liquid crystal ("LC") layer 3 and a sealant 310 that seals the panels 100 and 200 together. The LC layer 3 includes LC molecules 31.

As shown in FIG. 3, the LC molecules 31 of the LC layer 3 may be aligned in a vertical alignment ("VA") mode or a twisted nematic ("TN") alignment mode. Alternatively, the LC molecules 31 may have a symmetrically bent alignment with respect to a center side of two panels 100 and 200.

The TFT array panel 100 will now be described.

The TFT array panel 100 is divided into a display area DA and a peripheral area PA that is external to the display area DA, and the sealant 310 is positioned on the boundary of the display area DA and the peripheral area PA. The LC layer 3 is enclosed within the display area DA by the sealant 310.

A plurality of gate lines 121 are formed on an insulating substrate 110 made of a material such as plastic.

The gate lines 121 transmit gate signals and extend substantially in a transverse direction, such as a first direction. Each of the gate lines 121 includes a plurality of gate electrodes 124 projecting downward, towards an adjacent gate line 121, and an end portion 129 having a large area for contact with another layer or an external driving circuit. Although not shown, storage electrode lines may also be formed on the insulating substrate 110, extending substantially parallel to the gate lines 121.

A gate insulating layer 140, made of a material such as silicon nitride (SiNx) or silicon oxide (SiOx), is formed on the gate lines 121 and exposed portions of the insulating substrate 110. If the storage electrode lines are included, then the gate insulating layer 140 may be further formed on the storage electrode lines.

A plurality of semiconductor stripes 151 preferably made of hydrogenated amorphous silicon ("a-Si") or polysilicon are formed on the gate insulating layer 140. Each of the semiconductor stripes 151 extends substantially in the longitudinal direction, a second direction substantially perpendicular to the first direction, and includes a plurality of projections 154 branched out toward the gate electrodes 124.

A plurality of ohmic contact stripes and islands 161 and 165 are formed on the semiconductor stripes 151.

The ohmic contact stripes and islands 161 and 165 are preferably made of a-Si heavily doped with an n-type impurity such as phosphorous or a p-type impurity such as boron, or they may be made of silicide. Each of the ohmic contact stripes 161 includes a plurality of projections 163.

A plurality of data lines 171 and a plurality of drain electrodes 175 are formed on the ohmic contacts 161 and 165 and the gate insulating layer 140.

Each data line 171 includes a plurality of source electrodes 173 projecting toward the gate electrodes 124, and an end portion 179 having a large area for contact with another layer or an external driving circuit.

A gate electrode 124, a source electrode 173, and a drain electrode 175 along with a projection 154 of the semiconductor 151 form a TFT having a channel formed in the projection 154 between the source electrode 173 and the drain electrode 175.

The ohmic contacts 161 and 165 are interposed only between the underlying semiconductors 151 and 154 and the overlying conductors 171 and 175 thereon, and reduce contact resistance therebetween.

A passivation layer 180 is formed on the data lines 171, the drain electrodes 175, and the exposed portions of the semiconductor stripes 151, as well as on exposed portions of the gate insulating layer 140.

The passivation layer 180 has a plurality of contact holes 182 and 187 exposing the end portions 179 of the data lines 171, and the drain electrodes 175, respectively. The passivation layer 180 and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180.

The pixel electrodes 191 are physically and electrically connected to the drain electrodes 175 through the contact holes 187 such that the pixel electrodes 191 receive data voltages from the drain electrodes 175.

The contact assistants 81 and 82 are connected to the end portions 129 of the gate lines 121 and the end portions 179 of the data lines 171 through the contact holes 181 and 182, respectively.

An alignment layer 11 is formed on the pixel electrodes 191 and the contact assistants 81 and 82, and may be further formed on portions of the passivation layer 180 not covered by the pixel electrodes 191.

Next, the common electrode panel 200 will be described.

As shown in FIG. 3, a light blocking member 220, also referred to as a black matrix, is formed on a flexible insulating substrate 210 made of a material such as plastic.

The light blocking member 220 prevents light leakage between the pixel electrodes 191 of the TFT array panel 100, and may alternatively be formed on the TFT array panel 100.

A plurality of color filters 230 are also sequentially formed on the light blocking members 220 and on exposed portions of the insulating substrate 210. The color filters 230 may each represent one color in a set of colors, such as primary colors and such as red, green, and blue colors. The color filter 230 overlaps the adjacent light blocking member 220.

An overcoat 250 is formed on the color filters 230 and the light blocking member 220. The overcoat 250 has a flat surface. A common electrode 270 is formed on the overcoat 250. The common electrode 270 is preferably made of a transparent conductive material such as indium tin oxide ("ITO") and indium zinc oxide ("IZO").

An alignment layer 21 is formed on the common electrode 270. In an alternative exemplary embodiment, the overcoat 250 may be omitted.

A plurality of spacers 320 is formed on the alignment layer 21. The spacers 320 are formed relative to locations where opaque thin film portions on which the TFTs are formed, or where the gate lines 121, the data lines 171, etc. are formed. Thus, the spacers 320 are disposed on portions of the common electrode panel 200 on which the light blocking member 220 is positioned.

Each of the spacers 320 includes a plurality of column spacers 326, a plurality of ball spacers 323, and an adhesive 327.

In each spacer 320, the plurality of column spacers 326 are spaced apart from each other, and the ball spacers 323 and the adhesive 327 are filled within spaces between the column spacers 326. At this time, the column spacers 326 and the ball spacers 323 are fixed between the common electrode panel 200 and the TFT array panel 100 by the adhesive 327, and maintain the cell gap of the LCD. Thus, the spacers 320 may also be termed cell gap spacers 320.

Thus, the cell gap is uniformly maintained by the interaction of the different types of spacers, including the column spacers 326 and the ball spacers 323, even when the LCD that includes the flexible substrates 110 and 210 is bent.

The common electrode panel 200 faces the TFT array panel 10, as shown in FIG. 1, and the two panels 100 and 200 are assembled by the sealant 310 on the boundary of the display area DA and the peripheral area PA. Since the spacers 320 along with the sealant 310 also function to assemble the panels 100 and 200, adherence of the panels 100 and 200 is improved.

In an exemplary embodiment, the sealant 310 may include the column spacers 326, the ball spacers 323, and the adhesive 327, like the spacers 320.

The sealant 310 seals the LC layer 3 having the LC molecules 31 within the display area DA between the panels 100 and 200. At this time, the common electrode 270 of the common electrode panel 200 faces the pixel electrodes 191 of the TFT array panel 100.

The common electrode 270 generates electric fields in cooperation with the pixel electrodes 191, which determine the orientations of the LC molecules 31 of the LC layer 3 disposed between the electrodes 191 and 270. Polarization of light passing through the LC layer 3 is varied based on the orientations of the LC molecules 31.

Next, an exemplary manufacturing method of the common electrode panel 200 will be described with reference to FIGS. 4 to 9 as well as FIGS. 1 to 3.

Figure 4:
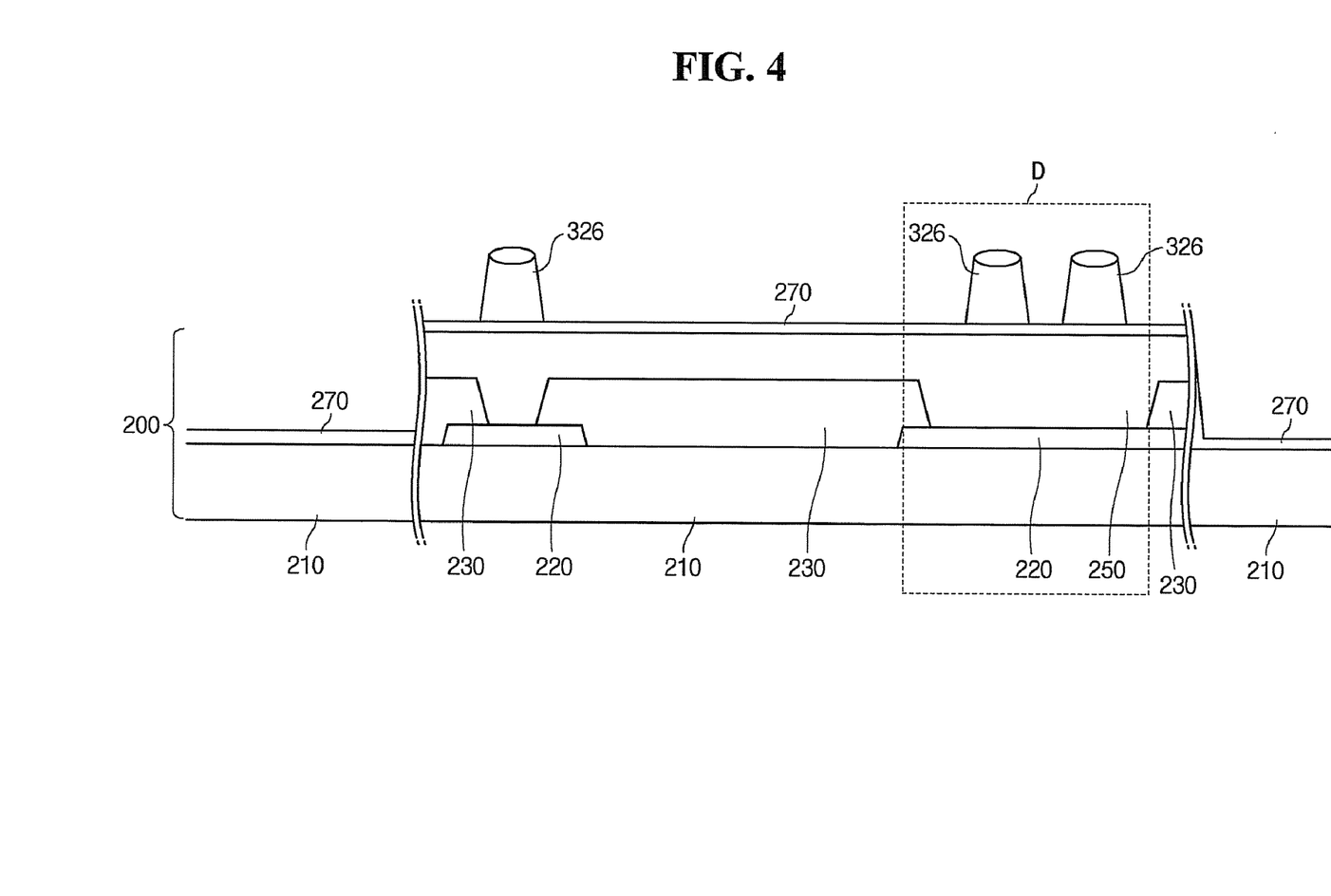
FIGS. 4, 8, and 9 are sectional views sequentially showing processes forming exemplary spacers on the exemplary common electrode panel shown in FIG. 3.
Figure 6A:
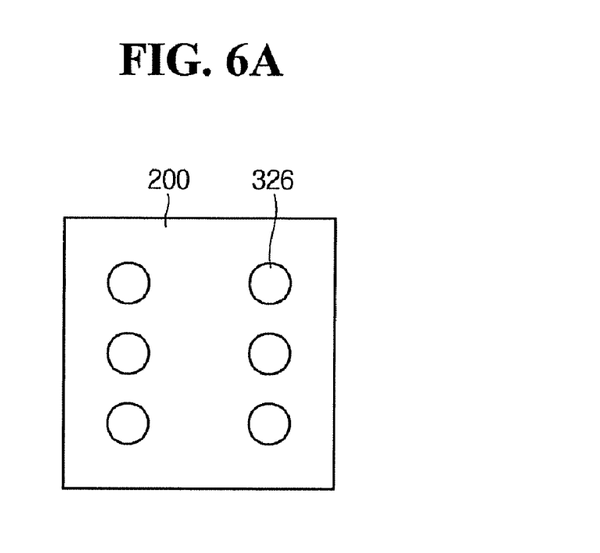
Figure 6B:
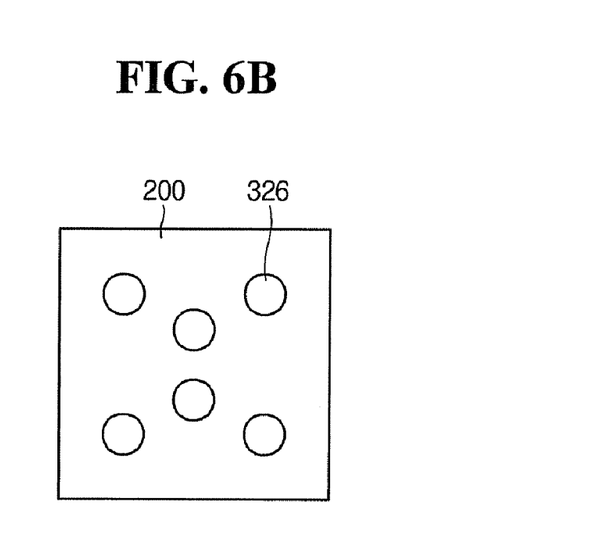
Figure 7A:
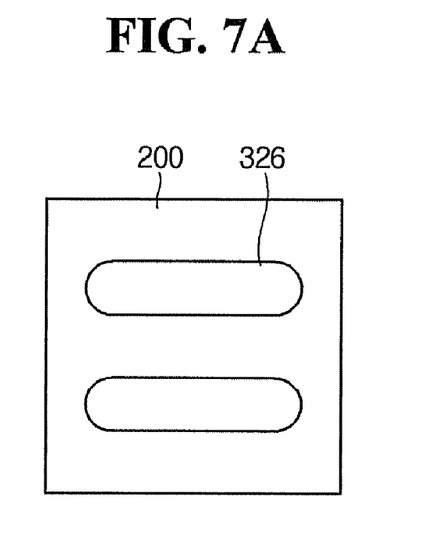
Figure 7B:
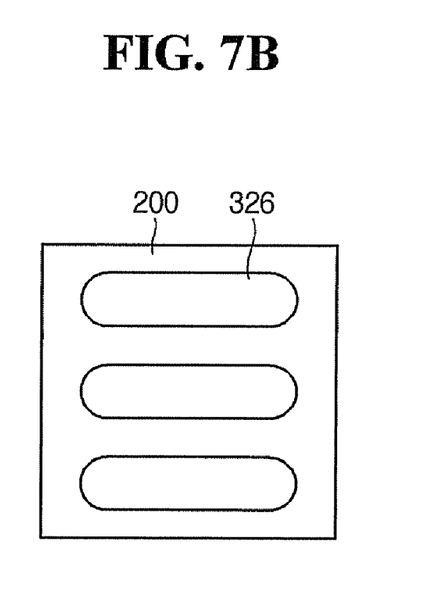
Figure 8:
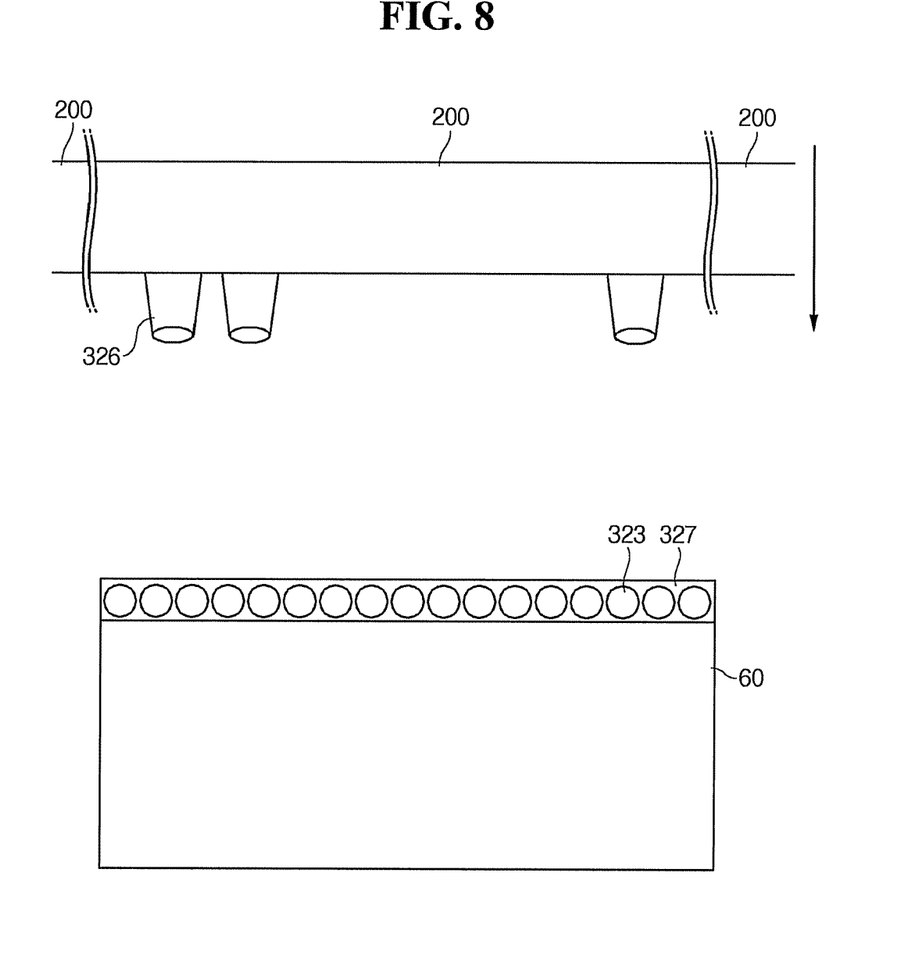
Figure 9:
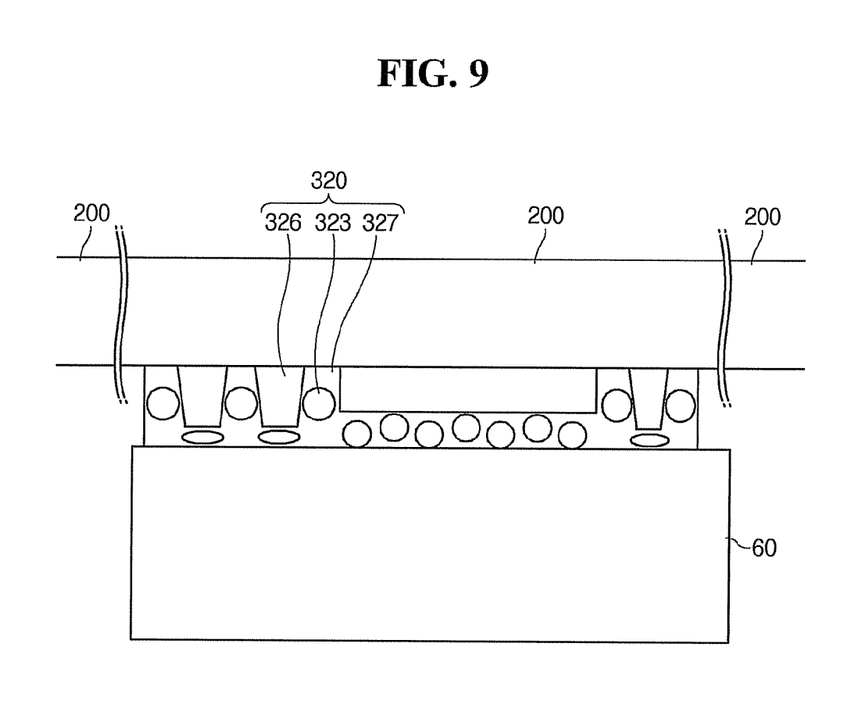

FIGS. 4, 8, and 9 are sectional views sequentially showing exemplary processes for forming exemplary spacers on the exemplary common electrode panel shown in FIG. 3, and FIGS. 5A-5C, 6A-6B, and 7A-7B are top views of portion "D" of FIG. 4.

As shown in FIG. 4, a light blocking member 220 is formed on a substrate 210 made of a material such as a plastic.

A plurality of color filters 230 are formed on the substrate 210, partially overlapping the light blocking member 220.

An overcoat 250 is formed on the color filters 230 and the light blocking member 220.

Then, a common electrode 270 is formed on the overcoat 250, and an alignment layer 21 is formed on the common electrode 270.

Figure 5A:
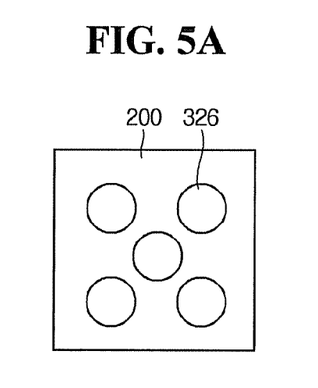
FIGS. 5A-5C, 6A-6B, and 7A-7B are top views of portion "D" of FIG. 4.
Figure 5B:
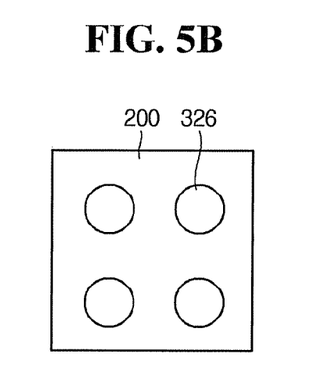
Figure 5C:
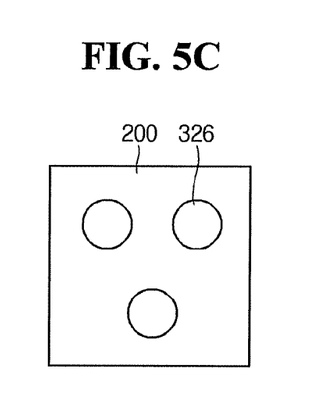

A plurality of column spacers 326 are formed on regions of the alignment layer 21, overlapping portions of the light blocking member 220, by photolithography. It is assumed that a portion of the light blocking member 220 corresponding to each spacer 320, or to at least one of the spacers 320, is a quadrangle of a size of about 40 μm× about 40 μm, and that a height of a cell gap between the panels 100 and 200 is about 5 μm. In this case, as shown in FIGS. 5A to 5C, the column spacers 326 of each spacer 320, or of at least one spacer 320, corresponding to the corresponding portion may be formed on each apex and a center portion of the quadrangle as shown in FIG. 5A, or on each apex of the quadrangle as shown in FIG. 5B, or in a triangular shape in the quadrangle as shown in FIG. 5C. At this time, each of the column spacers 326 may have a diameter of about 10 μm and a height of about 3 μm.

When the diameter of the column spacer 326 is smaller than about 10 μm, the number of column spacers 326 formed in one spacer 320 may be increased as compared to the exemplary embodiments of FIGS. 5A to 5C. For example, when the column spacers 326 having a diameter of about 5 μm and a height of about 3 μm are formed, the column spacers 326 may be disposed on portions of the alignment layer 21, in an area overlapping the light blocking member 220, positioned in a 3×2 matrix as shown in FIG. 6A or a combined shape of a character "Y" and a "reversed-character Y", as shown in FIG. 6B.

In addition, when the cross-section of the column spacers 326 has a longitudinal shape, as shown in FIGS. 7A and 7B, the plurality of column spacers 326 may be disposed in a line. For example, as shown in FIG. 7A, two column spacers 326 may be disposed substantially parallel to each other, and in FIG. 7B, three column spacers 326 may be disposed substantially parallel to each other. More than three column spacers 326 each having a smaller width may also be disposed in parallel within a spacer 320.

As shown in FIG. 8, a mixture of a plurality of ball spacers 323 and an adhesive 327 is applied on a plate 60 of a micro-contact printing device (not shown) using a nozzle, etc. At this time, a diameter and a height of the ball spacers 323 may be defined with regard to desired heights of the cell gap and the column spacers 326.

Sequentially, the plate 60 of the micro-contact printing device, on which the mixture of the ball spacers 323 and the adhesive 327 is applied, is disposed opposite to the column spacers 326 formed on the common electrode panel 200.

Next, as shown in FIG. 9, by moving the common electrode panel 200 towards the plate 60, or moving the plate 60 towards the common electrode panel 200, or moving the common electrode panel 200 and the plate 60 towards each other, end portions of the column spacers 326 contact the mixture of the ball spacers 323 and the adhesive 327. About 30% to about 70% of the height of the column spacers 326 may contact the mixture. At this time, the adhesive 327 and the ball spacers 323 are filled within the spaces between the column spacers 326 to enclose external walls of the column spacers 326 by a capillary phenomenon. Thereby, the ball spacers 323 and the column spacers 326 are hardly fixed by the adhesive 327, and spacers 320 including the ball spacers 323, the column spacers 326 and adhesive 327 are formed.

The common electrode panel 200 on which the spacers 320 are formed is separated from the plate 60 of the micro-contact printing device Then, as shown in FIG. 1, a sealant 310 is formed on the common electrode panel 200 to enclose the display area DA, to assemble the common electrode panel 20 and the TFT array panel 100. At this time, the common electrode panel 200 and the TFT array panel 100 are also assembled by the adhesive 327 of the spacer 320. Thus, adherence between the common electrode panel 200 and the TFT array panel 100 is improved. Alternatively, the sealant 310 may be formed on the TFT array panel 100.

Alternatively, the sealant 310 may be formed along with the spacers 320. In this case, the sealant 310 also includes a plurality of column spacers 326, a plurality of ball spacers 323, and an adhesive 327.

As described above, by forming the spacers 320 fixed on the common electrode panel 200, of which the ball spacers 323 and the adhesive 327 are filled between the column spacers 326, the alignment layers 11 and 21 are prevented from being damaged due to free movement of the spacers 320.

In addition, since the common electrode panel 200 and the TFT array panel 100 are assembled by the sealant 310 and the spacer 320, a cell gap variation due to bending or deformation of the flexible substrates 100 and 200 by physical force or heat is prevented.

In the above-described exemplary embodiments, the substrates 110 and 210 made of plastic are flexible substrates, however, in alternative exemplary embodiments, both substrates 110 and 210 or one of the substrates 110 and 210 may be made a material such as glass, etc.

According to the present invention, spacers maintaining a cell gap of a display device include a plurality of column spacers, and a plurality of ball spacers and an adhesive that are filled within spaces between the column spacers. Since an upper panel, such as a common electrode panel, and a lower panel, such as a TFT array panel, of the display device are assembled by the spacers as well as a sealant, adherence of the two panels is improved.

In addition, the column spacers and the ball spacers disposed between the two panels and hardly fixed by the adhesive prevent a cell gap variation by bending or deformation of the substrates, and thereby luminance and image quality of the display device increase.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a first display panel;
a second display panel facing the first display panel; and
a plurality of cell gap spacers maintaining a distance between the first display panel and the second display panel,
wherein each of the cell gap spacers comprises column spacers, ball spacers, and an adhesive,
wherein the ball spacers and the adhesive are filled within spaces between the column spacers and enclose external walls of the column spacers.

2. The display device of claim 1, wherein the second display panel comprises:
a flexible substrate;
a light blocking member formed on the flexible substrate;
a color filter formed on the flexible substrate; and
a common electrode formed on the color filter.

3. The display device of claim 2, wherein the cell gap spacers are formed at portions of the second display panel so as to overlap the light blocking member.

4. The display device of claim 2, wherein the flexible substrate includes plastic.

5. The display device of claim 2, wherein the second display panel further comprises an alignment layer formed on the common electrode, the cell gap spacers formed on the alignment layer.

6. The display device of claim 1, further comprising:
a liquid crystal layer interposed between the first display panel and the second display panel; and
a sealant formed between the first display panel and the second display panel and sealing the liquid crystal layer,
wherein the sealant comprises a column spacer, a ball spacer, and an adhesive.

7. The display device of claim 1, wherein the column spacers of at least one cell gap spacer are formed on apexes and a center portion of a corresponding portion of a light blocking member of the second display panel, or on apexes of the corresponding portion, or in a triangular shape within the corresponding portion.

8. The display device of claim 1, wherein the column spacers of at least one cell gap spacer are formed in a 3×2 matrix or a combined shape of a Y-shaped character and a reverse Y-shaped character in a corresponding portion of a light blocking member of the second display panel.

9. The display device of claim 1, wherein the column spacers of at least one cell gap spacer have a longitudinal shape, respectively, and are disposed in a line.

10. The display device of claim 1, wherein each cell gap spacer is formed on the second display panel to correspond to an area of the first display panel that does not transmit light, the area including at least one of a thin film transistor, a gate line, and a data line.

11. The display device of claim 1, wherein at least one of the cell gap spacers is formed within a quadrangle size of about 40 μm by about 40 μm.

12. A display device comprising:
a first display panel;
a second display panel facing the first display panel; and
a plurality of cell gap spacers maintaining a distance between the first display panel and the second display panel,
wherein each of the cell gap spacers comprises at least one column spacer, a ball spacer, and an adhesive,
wherein the at least one column spacer, the ball spacer and the adhesive are disposed between the first display panel and the second display panel, and the adhesive contacts both the at least one column spacer and the ball spacer.

13. The display device of claim 12, wherein the second display panel comprises:
a flexible substrate;
a light blocking member formed on the flexible substrate;
a color filter formed on the flexible substrate; and
a common electrode formed on the color filter.

14. The display device of claim 13, wherein the cell gap spacer is formed at portions of the second display panel so as to overlap the light blocking member.

15. The display device of claim 13, wherein the flexible substrate includes plastic.

16. The display device of claim 13, wherein the second display panel further comprises an alignment layer formed on the common electrode, the cell gap spacers formed on the alignment layer.

17. The display device of claim 12, further comprising:
a liquid crystal layer interposed between the first display panel and the second display panel; and
a sealant formed between the first display panel and the second display panel and sealing the liquid crystal layer,
wherein the sealant comprises a column spacer, a ball spacer, and an adhesive.

18. The display device of claim 12, wherein each of the at least one column spacer is formed on apexes and a center portion of a tetragonal portion corresponding to a light blocking member of the second display panel, or only on apexes of the tetragonal portion, or only on apexes of a triangular portion corresponding to a light blocking member of the second display panel.

19. The display device of claim 12, wherein each of the at least one column spacer has a longitudinal shape and is disposed in a line.

20. The display device of claim 12, wherein each cell gap spacer is formed on the second display panel to correspond to an area of the first display panel that does not transmit light, the area including at least one of a thin film transistor, a gate line, and a data line.

* * * * *